Oct. 19, 1954     W. H. TAIT     2,691,814
POLYTETRAFLUORETHYLENE IMPREGNATED BEARINGS
Filed Nov. 24, 1952
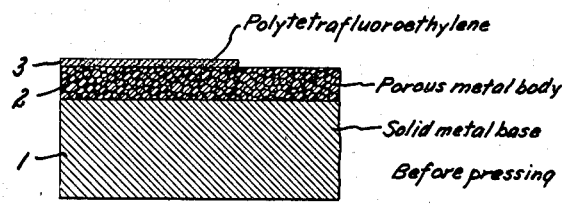
Fig. 1.
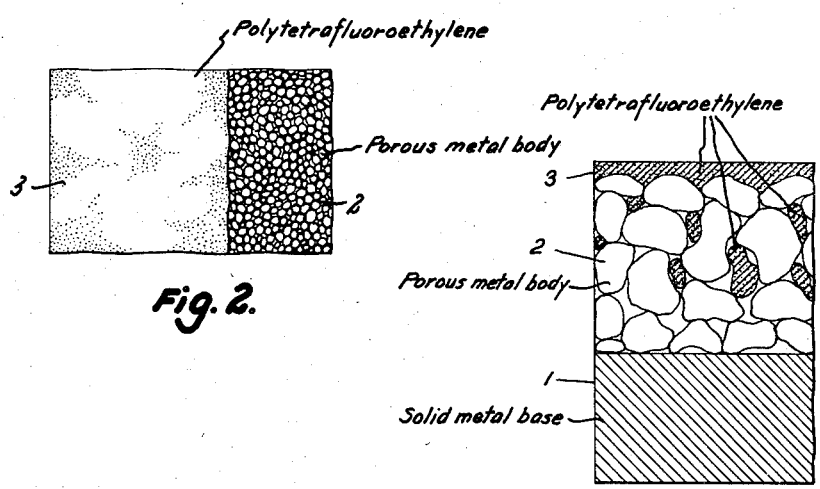
Fig. 2.
Fig. 4.
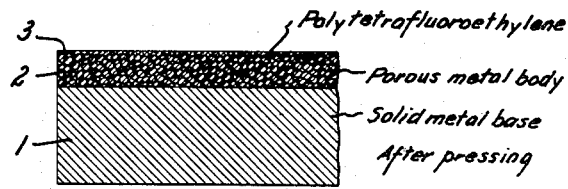
Fig. 3.
INVENTOR
William Henry Tait
BY Pierce, Scheffler & Parker
ATTORNEYS

UNITED STATES PATENT OFFICE 2,691,814

POLYTETRAFLUORETHYLENE IMPREGNATED BEARINGS

William Henry Tait, Alperton, Wembley, England, assignor to The Glacier Metal Company Limited, Wembley, England, a British company Application November 24, 1952, Serial No. 322,230

7 Claims. (Cl. 29—182.5)

This invention relates to plain bearings or the like, the term "plain bearings" including journal bearings or bearing liners, thrust washers and flat anti-friction elements for sliding contact.

The invention also has for an object to provide an improved bearing material, structure or liner which is adapted for effective operation without the use, or in the temporary absence, of an intermediate separating film of oil or other lubricant and which can serve either as a bearing in itself, or as a bearing facing when attached to a backing or support.

A further object of the invention is to provide a bearing material which incorporates polytetrafluoroethylene at least over a part of the bearing surface.

It is known that polytetrafluoroethylene possesses good anti-friction properties for use with steel or other usual journal materials and that it retains these properties in the absence of an intermediate separating film of oil or other lubricant and at temperatures up to about 280° C.

Polytetrafluoroethylene in itself has three disadvantages as a bearing material. In the first place, it possesses a high coefficient of thermal expansion which, on any substantial variation in temperature, will change the clearance between the bearing and journal or thrust face to cause excessive looseness when cooled again to atmospheric temperature. In the second place, it possesses low heat conductivity with the result that the surface layers of a bearing are liable to over heat above the transition temperature (327° C.). In the third place it possesses poor mechanical strength.

It has also been proposed to manufacture bearings from a continuous matrix of polytetrafluoroethylene, in which are contained discrete particles of powdered metal or alloy, but we have found that such a structure, when used for bearings, still suffers from the same three disadvantages even when a considerable proportion of metal is present as discrete particles in the final structure. This is due to the fact that the metallic particles do not form a continuous phase and therefore do not lend any strength or heat-conductivity to the structure. It has further been proposed to incorporate wire wool or gauze in a plastic matrix, but this construction involves manufacturing difficulties and does not provide adequate strength or support to any but very lightly loaded bearings.

More specifically, the present invention has for its object to utilise the good anti-friction properties of polytetrafluoroethylene for normal bearing duties while avoiding the disadvantages referred to above.

According to the present invention, a bearing material comprises a substantially continuous metallic matrix having interstices containing polytetrafluoroethylene.

The invention also includes a bearing material comprising a continuous spongiform metallic structure in which the majority of the interstices are themselves interconnected and contain polytetrafluoroethylene.

Generally, the total volume of metal in the material will be greater than the total volume of polytetrafluoroethylene but the heat conductivity is basically ensured by the continuity of the metal structure.

As an extreme example, considering a structure containing 50% polytetrafluoroethylene by volume, as a continuous phase, and 50% copper by volume as discrete particles, dispersed in the polytetrafluoroethylene, it can be assumed that, taking the heat-conductivity of copper as 100%, the heat-conductivity of the composite structure will be not more than 5%, and probably less than 2%.

On the other hand, if the material contains 50% copper by volume, as a continuous phase, and 50% polytetrafluoroethylene by volume either continuous, or in the form of discrete particles, the heat conductivity will be at least 50%, taking the heat conductivity of copper as 100%.

In the majority of cases, it will be found advantageous for the volume of metal in the material to exceed the volume of polytetrafluoroethylene considerably.

The invention is illustrated by the accompanying drawings in which

Fig. 1 is an enlarged fragmentary diagrammatic sectional view of a solid metal base or backing having a layer of porous or sponge metal attached thereto and a layer of polytetrafluoroethylene in finely divided or sheet form superposed thereon, Fig. 2 is a top plan view of the structure shown in Fig. 1, Fig. 3 is a view similar to Fig. 1 after the layer of polytetrafluoroethylene has been pressed into the porous layer, and Fig. 4 is an enlarged sectional view showing the pores in the layer of sponge metal and the polytetrafluoroethylene extending from the surface into these pores.

Referring to the drawings 1 is the metal base or support, 2 is the porous metal layer and 3 is the polytetrafluoroethylene.

The porous or sponge metal layer 2 was made by sintering spherical metal powder of a size capable of passing through a 100 mesh screen with only 20% passing a 150 mesh screen. The metal occupies about 70% of the volume of the sponge and the polytetrafluoroethylene penetrates into the sponge to a depth of from 2 to 5 meshes.

When the polytetrafluoroethylene is applied in the form of a sheet a thickness of about 0.005 inch is used. When powder is used a quantity equivalent to a sheet 0.005 inch thick is used.

In one form of bearing according to the invention the metallic structure is, at least on its surface, of open character adapted to support and substantially surround and retain discrete particles of polytetrafluoroethylene. Advantageously, the texture of the porous or open metallic structure is extremely fine, and in use a very thin but continuous film of polytetrafluoroethylene is present over the bearing surface.

Bimetallic porous surfaced strip material from which bushes, bearings, bearing liners, thrust washers or the like can be produced is usually prepared by first spreading on to a backing strip of steel or relatively strong non-ferrous metal or alloy a layer of suitable metallic powder or powders and then sintering the said layer to form the porous metallic structure and to bond it to the backing. By suitable control of the temperature, the powder grain size and shape, and the time of sintering, a porous structure with predetermined pore size and volume can be obtained utilising powders of any one or more of several metals and alloys, such as copper, tin-bronze, lead-bronze, lead-tin-bronze, silver, iron or cupro-nickel.

Furthermore, by usual conventional methods, the porous metallic structure can be strongly bonded to the non-porous relatively strong backing material such as steel, or a non-ferrous alloy such as a copper alloy.

According to one embodiment of the present invention as illustrated in Figs. 1, 2, 3 and 4, a method of producing plain bearings as hereinbefore described comprises applying a layer of polytetrafluoroethylene on to the surface of a porous metallic structure produced by sintering metallic powder, and forcing the polytetrafluoroethylene into at least the surface pores of the metallic structure by the application of pressure. Preferably the pressing operation is carried out while heating to a temperature of 250° to 300° C. in order to soften the polytetrafluoroethylene and facilitate its flow for filling the pores. The polytetrafluoroethylene may be applied in the form of powder or in the form of sheet.

A duplex structure in which the metallic and non-metallic elements appear as interlaced sponges of fine texture may be produced by sintering together a suitable mixture of powders of polytetrafluoroethylene and a suitable metal, metal alloy or mixture capable of being sintered at temperatures below the disassociating temperature of the polytetrafluoroethylene e. g., below 400° C. Silver is one such metal.

The incorporation of the polytetrafluoroethylene in the porous or open metallic structure serves to compensate for the low heat conductivity of the polytetrafluoroethylene and also serves to limit the effect of thermal expansion of polytetrafluoroethylene. Moreover the metal structure provides the necessary strength which is lacking in polytetrafluoroethylene itself.

In carrying the invention into effect according to one embodiment, a porous metallic structure or a bimetal material having a porous bearing surface structure is produced by sintering a metallic powder on to a backing strip. For example, a layer of metallic powder or mixture of powders of suitable composition to produce, on sintering, a copper-tin-lead, e. g., of 80:10:10 composition, is applied on to a copper-plated steel strip, the powder grain size and shape and the period and temperature of the sintering operation being such that the sintered structure is of a porous spongy nature, the total voids being, for instance 20% of the total volume.

On the porous surface of the bimetallic strip, polytetrafluoroethylene is applied as by spreading thereon in powder form or by laying on in the form of a sheet and, while heating to 250° to 300° C., a suitable pressure, for example about one ton per square inch, is exerted until the softened polytetrafluoroethylene fills the pores in the porous metallic structure. Pressure preferably is exerted by means of a closed die adapted to prevent the polytetrafluoroethylene from flowing over the edges so that it is thereby constrained to enter the pores, but this is not essential. Although the porous structure preferably should be completely filled with the polytetrafluoroethylene it is sufficient if the penetration of the polytetrafluoroethylene into the pores extends to a depth of 0.030 to 0.040 inch from the bearing surface. The composition and character of the porous metallic structure may vary widely as is well known in the art, and the degree of pressure exerted, temperature at which the operation is carried out, and the period thereof, may be varied as required according to the character of the porous metallic structure and the form in which the polytetrafluoroethylene is applied. Inasmuch as sintering of the metallic structure is effected before the application of the polytetrafluoroethylene and is thus not restricted to temperatures below the disassociating temperature of the polytetrafluoroethylene wide latitude is available in the selection of the metallic powder employed and the conditions of sintering to secure the most satisfactory porous structure and the most effective bonding to the backing when such backing is provided.

In a modification of the invention, polytetrafluoroethylene in powder form and metallic powder of a suitable metal such as silver, or an alloy or mixture of metals capable of being sintered below the disassociating temperature of polytetrafluoroethylene are mixed in the ratio of five parts by volume of metallic powder to one part by volume of the powdered polytetrafluoroethylene both powders being sufficiently fine to pass through a 100 mesh screen. The mixed powder is then cold-pressed in a suitable die, the pressure being sufficient to compact the mixed powders into a moulded but "uncured" form sufficiently coherent for handling. This moulded form is then sintered in an atmosphere of cracked ammonia, i. e., a mixture of nitrogen and hydrogen produced by the disassociation of ammonia, at a temperature of about 360° C. for about one hour. While still hot the sintered body is pressed in a mould to the exact final shape desired, thereby producing a bush having a duplex structure consisting of metal and polytetrafluoroethylene in the form of interlaced sponges of fine texture, which bush may be of any desired size or shape and may be utilised in place of any self-lubricating porous bush of the usual type.

In a further embodiment, and in the application of the invention to the production of a composite thin-walled bearing having a steel, bronze, or other suitable backing, a plain blank, for example of steel of suitable dimensions for subsequent forming to cylindrical or semi-cylindrical form, is electroplated with a layer of copper about 0.0005 inch thick, and thereafter with a layer of silver 0.0003 inch on its surface. On this electroplated blank a layer of mixed metallic and non-metallic powders as hereinbefore specified is spread, this layer being of suitable thickness and being cold pressed with a sufficiently high pressure to ensure that it will remain on the blank as an adherent coating capable of being handled. The composite blank is then sintered in an atmosphere of cracked ammonia at a temperature of 360° C. for about one hour and is then pressed flat while still hot to consolidate the composite structure produced. The blank is then worked into the form of a bush or half-bush by any conventional or suitable method. Where the structure is formed by sintering a mixture of metallic powders and powdered polytetrafluoroethylene, the metallic constituents, e. g., silver, must be capable of sintering in a controlled atmosphere at temperatures below 400° C.

In the method illustrated in the drawings in which the polytetrafluoroethylene is deposited in the surface pores of the metal backing or support by laying a layer of polytetrafluoroethylene thereon in powder or sheet form and forcing the polytetrafluoroethylene into the pores by heat and pressure, the applied layer of polytetrafluoroethylene may be only that amount, found by experience, with the particular metal surface and temperature and pressure employed, which may be completely or substantially completely forced into the pores. Or an excess of the polytetrafluoroethylene may be applied and the excess permitted to escape laterally in the pressing operation so that none or only a microscopic film of the polytetrafluoroethylene covers the uppermost portions of the metal body. Or an excess of the polytetrafluoroethylene may be applied so that after forcing a part of it into the pores of the metal body there remains a substantial layer of the polytetrafluoroethylene over the uppermost portions of the metal body and this layer, if it is of more than microscopic thickness may be removed in any suitable way as by cutting or abrasion.

The metallic structure may be of any suitable metal, metal alloy or metallic mixture.

It will be understood that the invention is not limited to the particular embodiments hereinbefore described, and that a duplex structure consisting of a porous or open work metallic support with polytetrafluoroethylene interspersed therein may be produced in any other suitable manner.

This application is a continuation-in-part of my application Serial No. 208,439, filed January 29, 1951.

I claim:

1. A lubricant-free bearing material comprising a continuous spongiform metallic structure in which the majority of the interstices which open at the surface of the structure are interconnected beneath the surface and are filled to a substantial depth with polytetrafluoroethylene.

2. A lubricant-free bearing material as defined in claim 1 in which the volume of metal is greater than the volume of the polytetrafluoroethylene within the zone in which the interstices are filled with the polytetrafluoroethylene.

3. A lubricant-free bearing material as defined in claim 1 in which the interstices in the spongiform metallic structure are filled with polytetrafluoroethylene to a depth of at least 0.002 inch.

4. A lubricant-free bearing material as defined in claim 1 in which the spongiform metallic structure and the polytetrafluoroethylene within the pores thereof are in the form of fine textured interlaced sponges.

5. A lubricant-free bearing material as defined in claim 1 in which the spongiform metallic structure in sintered silver powder.

6. A lubricant-free bearing material as defined in claim 5 in which the volume of silver is at least five times the volume of the polytetrafluoroethylene.

7. A lubricant-free bearing material as defined in claim 1 comprising a solid, non-porous metal backing metallurgically bonded to said spongiform metallic structure.

References Cited in the file of this patent

UNITED STATES PATENTS

| Number | Name | Date |
|---|---|---|
| 2,187,086 | Koehring | Jan. 16, 1940 |
| 2,352,958 | Lauer et al. | July 4, 1944 |
| 2,400,091 | Alfthan | May 14, 1946 |
| 2,431,430 | Shaw | Nov. 25, 1947 |
| 2,470,264 | Richardson | May 17, 1949 |
| 2,497,046 | Kropa | Feb. 7, 1950 |
| 2,615,768 | Schluchter | Oct. 28, 1952 |